(12) United States Patent         (10) Patent No.:     US 11,870,870 B2
Martin et al.                      (45) Date of Patent:     Jan. 9, 2024

(54) SYSTEMS AND/OR METHODS TO LIMIT QUERY HANDLING

(71) Applicant: Meteor Development Group, Inc., San Francisco, CA (US)

(72) Inventors: Nicholas Martin, San Bruno, CA (US); Matthew DeBergalis, San Francisco, CA (US); Geoffroy Pierre Alexis Carrier, Toronto (CA)

(73) Assignee: Apollo Graph, Inc., San Francisco, CA (US)

( * ) Notice: Subject to any disclaimer, the term of this patent is extended or adjusted under 35 U.S.C. 154(b) by 293 days.

(21) Appl. No.: 15/876,065

(22) Filed: Jan. 19, 2018

(65) Prior Publication Data

US 2019/0230182 A1    Jul. 25, 2019

(51) Int. Cl.
*G06F 16/00*      (2019.01)
*H04L 67/568*    (2022.01)
*H04L 9/40*        (2022.01)
*G06F 16/245*    (2019.01)
*G06F 16/951*    (2019.01)
*G06F 16/242*    (2019.01)
*H04L 67/02*      (2022.01)

(52) U.S. Cl.
CPC .......... *H04L 67/568* (2022.05); *G06F 16/245* (2019.01); *G06F 16/2433* (2019.01); *G06F 16/951* (2019.01); *H04L 63/0227* (2013.01); *H04L 63/0236* (2013.01); *H04L 63/0281* (2013.01); *H04L 63/101* (2013.01); *H04L 67/02* (2013.01)

(58) Field of Classification Search
CPC ............... H04L 67/568; H04L 63/0227; H04L 63/0236; H04L 63/0281; H04L 63/101; H04L 67/02; G06F 16/2433; G06F 16/245; G06F 16/951
See application file for complete search history.

(56) References Cited

U.S. PATENT DOCUMENTS

| | | | | |
|---|---|---|---|---|
| 2007/0266426 | A1* | 11/2007 | Iyengar | H04L 9/3213 |
| | | | | 726/5 |
| 2014/0317738 | A1* | 10/2014 | Be'ery | H04L 63/14 |
| | | | | 726/23 |
| 2016/0381048 | A1* | 12/2016 | Zhao | H04L 63/1458 |
| | | | | 726/23 |
| 2017/0163724 | A1* | 6/2017 | Puri | H04L 67/2842 |
| 2018/0020002 | A1* | 1/2018 | Duca | G06F 21/572 |
| 2018/0121026 | A1* | 5/2018 | Nadig | G06F 40/103 |
| 2019/0116158 | A1* | 4/2019 | Patil | H04L 69/22 |

OTHER PUBLICATIONS

U.S. Appl. No. 15/687,379 / Notice of Publication, dated Feb. 28, 2019, 1 page.

(Continued)

*Primary Examiner* — Anhtai V Tran
(74) *Attorney, Agent, or Firm* — Berkeley Law & Technology Group, LLP

(57) ABSTRACT

Embodiments are disclosed of systems and/or techniques for rate-limiting query-type requests, such as including content-type requests, to computing and/or networking devices, such as, for example, servers, capable of communicating over a computing and/or communications network.

26 Claims, 5 Drawing Sheets

(56) References Cited

OTHER PUBLICATIONS

Graphql, "A Query Language for Your API," http://graphql.org/, Jun. 1, 2017, 9 Pages.
Graphql, "GraphQL: A Data Query Language," https://code.facebook.com/posts/1691455094417024/graphql-a-data-query-language/, Sep. 14, 2015, 3 Pages.
Apollo Graphql, "Apollo provides a universal GraphQL API on top of your existing services, so you can build new application features fast without waiting on backend changes," https://www.apollodata.com/, Jun. 1, 2017, 5 Pages.
Wikipedia, "Rate Limiting," https://en.wikipedia.org/wiki/Rate_limiting, Jun. 1, 2017, 2 Pages.
Graphql, "Caching," http://graphql.org/iearn/caching/, Dec. 7, 2017, 3 Pages.
Sturgeon, "GraphQL vs REST: Caching," https://philsturgeon.uk/api/2017/01/26/graphql-vs-rest-caching/, Jan. 26, 2017, 7 Pages.
Graphql, "Thinking in GraphQL," http://facebook.github.io/relay/docs/en/thinking-in-graphql.html#client-caching, Dec. 7, 2017, 13 Pages.
NPM, "graphql-cache," https://www.npmjs.com/package/graphql-cache, Dec. 7, 2017, 7 Pages.
Github, "Apollograhql—Client," https://github.com/apollographql/apollo-client, Dec. 7, 2017, 4 Pages.
Github, "Apollograhql-Server," https://github.com/apollographql/apollo-server, Dec. 7, 2017, 6 Pages.
Github, "Apollograhql-Dataloader," https://github.com/facebook/dataloader, Dec. 7, 2017, 8 Pages.
Apollo Graphql Tools, "Data fetching," https://www.apollographql.com/docs/graphql-tools/connectors.html#dataloader, Dec. 7, 2017, 5 Pages.
Apache, "Caching Guide," https://httpd.apache.org/docs/2.4/caching.html, Dec. 7, 2017, 11 Pages.
NGINX, "A Guide to Caching with NGINX and NGINX Plus," https://www.nginx.com/blog/nginx-caching-guide/, Jul. 23, 2015, 15 Pages.
Fastly, "Fastly powers fast, secure, and scalable digital experiences," https://www.fastly.com/, Dec. 7, 2017, 6 Pages.
Akamai, "The World's Largest and Most Trusted Cloud Delivery Platform," https://www.akamai.com/, Dec. 7, 2017, 3 Pages.
AWS, "Amazon CloudFront," https://aws.amazon.com/cloudfront/, Dec. 7, 2017, 8 Pages.
Sangria, "Protection Against Malicious Queries," https://sangria-graphql.org/learn/#protection-against-malicious-queries, Jan. 24, 2018, 22 Pages.
Youtube, "GraphQL SF: Subscriptions, Yelp's Public API, GraphQL at Airbnb," https://www.youtube.com/watch?v=rapO30fpREg, Jun. 1, 2017, 2 Pages.
Github Developer, "GraphQL resource limitations,"https://developer.github.com/v4/guides/resource-limitations/, Jan. 24, 2018, 7 Pages.
Github Developer, "Rate Limit," https://developer.github.com/v3/rate_limit/,' Jan. 24, 2018, 2 Pages.
Akamai, "DDoS Protection," https://www.akamai.com/uk/en/resources/ddos-protection.jsp, Jan. 24, 2018, 3 Pages.
Facebook for Developers, 'Rate Limiting on the Graph API, Jan. 24, 2018, 8 Pages.
AWS, "Throttle API Requests for Better Throughput," https://docs.aws.amazon.com/apigateway/latest/developerguide/api-gateway-request-throttling.html, Jan. 24, 2018, 3 Pages.
NGINX, "Rate Limiting with NGINX and NGINX Plus," https://www.nginx.com/blog/rate-limiting-nginx/, Jun. 12, 2017, 11 Pages.
Application as Filed, U.S. Appl. No. 15/687,379, filed Aug. 25, 2017, 81 Pages.
Filing Receipt, U.S. Appl. No. 15/687,379, mailed Sep. 1, 2017, 3 Pages.
Informational Notice to Applicant, U.S. Appl. No. 15/687,379, dated Sep. 1, 2017, 1 Page.
Response to Informational Notice to Applicant as Filed, U.S. Appl. No. 15/687,379, filed Nov. 13, 2017, 7 Pages.

* cited by examiner

SYSTEMS AND/OR METHODS TO LIMIT QUERY HANDLING

BACKGROUND

Field

This disclosure relates to systems and/or techniques to limit handling (e.g., processing) of queries, such as content-type requests, for example, by one or more servers that typically handle such query requests.

Information

As networking, such as via the Internet, for example, becomes more ubiquitous, approaches to improve networking performance continue to develop. As simply one example, improved performance of communications by mobile device software applications over a network continues to be desirable. An aspect of network communications related to mobile device software applications, again, as an example, may involve processing of one or more queries that may be generated by such an application.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
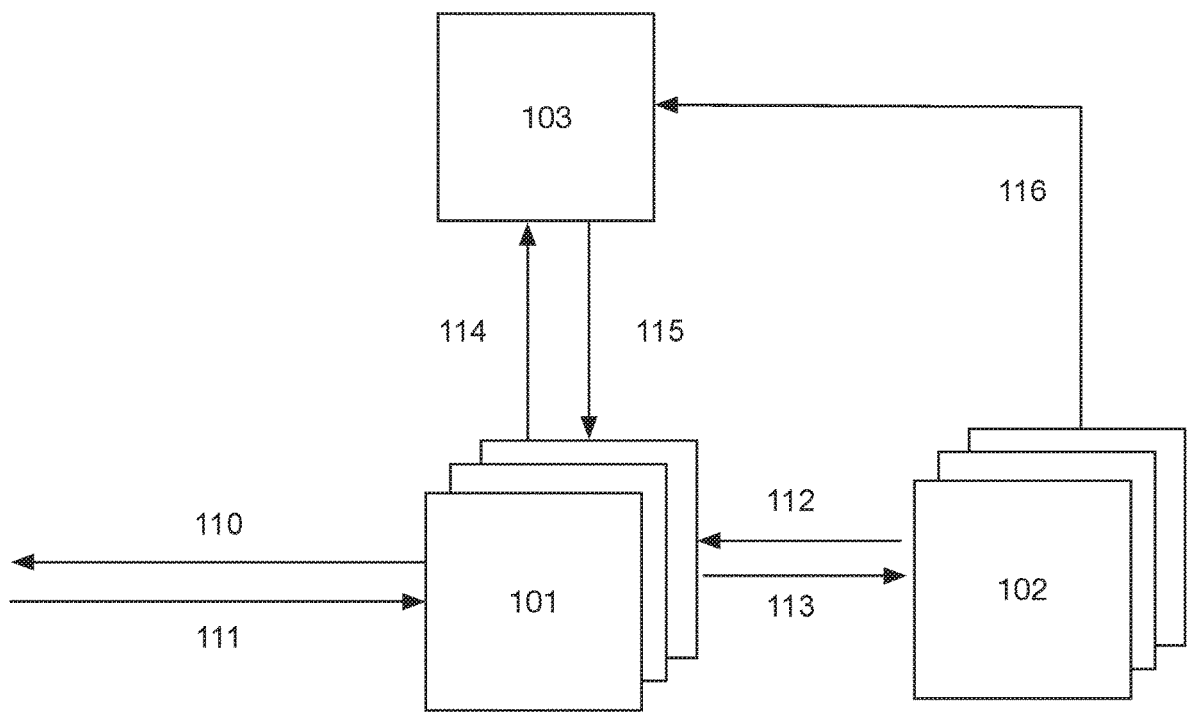
FIG. 1 is a schematic diagram illustrating an embodiment of an endpoint at a high-level.

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

DETAILED DESCRIPTION

Users may desire various types of content which may be sought via the Internet. For example, a client device (also referred to as a 'client') via a mobile application, for example, may generate a query, such as one that may include a content-type request. A few simple examples include a weather application, a news application, a stock market application, a music application, etc. In the example of a news application, a client may generate a request for articles related to a particular topic and/or a certain period of time. This request may be handled by a server, such as a so-called web server. Further, in this example, the web server may handle additional requests from the same and/or other clients. For convenience, throughout the rest of the present disclosure, a single website with a single server shall be referenced, with the understanding that multiple websites and/or multiple servers may likewise be involved, for example, in a given embodiment.

Handling content requests, such as by servers and/or other computing devices, may consume available resources and/or portions thereof, such as CPU resources, memory resources, network usage related resources, including aspects such as bandwidth, power, etc., and/or combinations thereof, to provide a few simple examples. It is noted, in the context of the present patent application, the terms 'query' and 'content request', or the like, may be used interchangeably without loss of generality.

Queries to be handled may vary in a variety of ways, including, as a few simple examples, type of query request, source of query, amount of queries to be handled, which may be quantified as a rate of queries per unit time, etc. Likewise, consumption of available resources to process queries may also vary. It follows consequently that performance of a server designated to handle such query requests may likewise vary depending at least in part on the manner in which a server attempts to perform such handling (e.g. processing). For example, a server may handle any and all queries. Alternatively, it may handle only some queries, perhaps in accordance with type or source, etc. A related aspect may be how a server may detect and/or handle malicious network traffic in the form of queries.

Accordingly, embodiments are disclosed of methods and/or systems in which query handling may be managed in a variety of aspects. For example, in an embodiment, parameters that may be used to influence query handling (e.g., query processing) may be determined dynamically. Such dynamic determinations, in one embodiment, may be based at least in part on certain prevailing conditions, such as conditions with respect to the server and/or related devices involved in the query handling, network conditions, etc., which shall be discussed in greater detail. Likewise, in another embodiment, dynamic determinations may be made substantially in accordance with certain prevailing conditions.

Thus, query handling (e.g., processing) may be managed based at least in part on various determinations, including dynamic determinations, which in an embodiment may comprise query handling being performed substantially in accordance with such determinations. Although, as mentioned previously, query handling (e.g., processing) may most accurately be described as being managed; as shall be described in more detail below, in a particular embodiment, management of query handling (e.g., processing) may be realized more specifically as a limit on handling of particular queries, such as limitations that may specify handling of queries based at least in part a variety of considerations, such as, to provide some examples, what types of queries to handle, how many queries to handle, and/or at what time to perform such query handling.

Thus, again, as an example, in a non-limiting embodiment, a host of client devices may generate a host of queries, such as, for example, content-type requests, that are intended to be handled by a server, for example. Thus, in an embodiment, as a performance management feature with respect to that particular server, for example, queries to be handled may be filtered. As an example, and described in more detail later, a proxy may filter queries to be handled by a server. Likewise, as discussed, and as shall be discussed below in more detail, determined parameters, for example, such as dynamically determined parameters, may be employed to at least in part effect query filtering, in a particular embodiment.

Continuing with an illustrative example, although claimed subject matter is not intended to be limited to examples provided primarily for purposes of illustration, a proxy, an endpoint and a control plane may be capable of mutually communicating, such as via network communications, so as to thereby result in management of handling of externally originating queries by the endpoint. An endpoint in the context of the present application refers to a single logical entity, often specified as a location, such as a URL, that operates as a source of content. In implementation, however, as described later, an endpoint may involve, but does not need to necessarily involve, multiple servers, multiple repositories, such as databases, etc. Thus, an endpoint may be thought of as a node of a network in which the node may be implemented via hardware and software in a host of different possible configurations and/or architectures, a few of which shall be illustrated later. Likewise, in the context of the present application, the term control plane refers to a logical entity, which, may, again, in an embodiment, comprise one or more devices, again, implemented as hardware and software, for example, that is able to determine parameters to be used by a proxy, in some embodiments dynamically, so that the proxy is able to more effectively perform a gateway function with respect to an endpoint. In the context of the present application, therefore, measurements may be used by a control plane to determine parameters, here, more specifically, in some embodiments, to dynamically determine such parameters, to be used by a proxy. For example, measurements of query-related consumption, such as generated at an endpoint, for example, may be employed. Likewise, measurements of query-related performance and/or query-related statistical measurements, as described in more detail later, may be employed. For example, as shall be described, for an embodiment, statistics related to query processing may be measured and accumulated. Furthermore, query-related structural features may also be employed. This is also described in more detail later, however, in general, structural features of a query, such as, for example, how it relates to a specified schema may be employed to affect determination of rate-limiting parameters, as described in more detail later. Thus, a GraphQL schema, for example, may comprise a specification of a set of content types and/or structures, levels of nesting, and/or fields, etc., which may indicate content available, such as to be queried. Similarly, a GraphQL path may specify for certain content fields, a path that may be followed and/or traversed to locate such content, such as in a repository. A GraphQL shape likewise may specify relationships within a GraphQL schema, such as for content types, etc., including interrelationships, nesting and/or other forms of association. Thus, at least to the extent queries may have structural features related to the foregoing, such query-related structural features may likewise be employed by a control plane in making determinations regarding rate-limiting parameters.

Similarly, in the context of the present application, the term proxy refers to a logical entity, which, may, again, in an embodiment, comprise one or more devices, again, implemented as hardware and software, for example, which is to operate as a gateway with respect to an endpoint so as to more effectively manage handling (e.g., processing) by the endpoint of queries that include content requests. Thus, in an embodiment, a control plane may, for example, determine parameters, in some embodiments dynamically, that may be employed by a proxy to limit query processing (e.g., handling) by an endpoint, for example.

Continuing with the foregoing, in an embodiment, various measurements may be made and may be used, at least in part, by a control plane, for example, to determine parameters, such as those to be employed to limit query processing, as previously discussed (e.g., query-related resource measurements, query-related performance measurements, query-related structural features, and/or query-related statistical measurements). Additionally, in an embodiment, a proxy, for example, may use determined parameters, including dynamically determined parameters, at least in part, to implement limiting query processing, such to limit processing performed by an endpoint. Thus, in an embodiment, as shall also be discussed in greater detail, a host of possible parameters may be determined, again, dynamically, in some embodiments, and may be used to limit query processing, Thus, in an embodiment, a proxy may, based at least in part on such parameters filter queries that are to be handled by an endpoint, so that queries that remain may ultimately be processed, potentially in a more effective manner, by the endpoint. Likewise, of course, in an embodiment, queries to be processed may be filtered substantially in accordance with such parameters.

It may be helpful to provide some discussion to more clearly illustrate in a networking-type setting potential performance advantages that may flow from an approach in which query handling by an endpoint is more actively managed. As mentioned, in an embodiment, a mobile application may generate one or more queries, such as a query that may include a content request. As is well-known, a variety of query languages exist to formulate queries for specific content being sought. Examples of query languages include Structured Query Language (SQL), XML Path Language (XPATH), and/or GraphQL, but these are just illustrative examples. The term Structured Query Language, SQL, and/or similar terms are intended to refer to any version, now known and/or to be later developed of the Structured Query Language. Similarly, the term XML Path Language, XPATH, and/or similar terms are intended to refer to any version, now known and/or to be later developed, of the XML Path Language. Likewise, the term GraphQL, and/or similar terms are intended to refer to any version, now known and/or to be later developed, of the GraphQL query language. Furthermore, as used herein, the terms query, query request, queries and/or the like are intended to refer to one or more queries formulated in a particular query language, such as one of the foregoing languages, for example.

Typically, a query comprises a content request of some type. Thus, as described previously, an application executing on a device, such as a mobile application executing on a client device, may generate one or more requests for content, such as if a user interacts with a GUI of the client device, for example. Again, generated content requests may be in the form of a specific query language. Likewise, a server designated to handle certain content requests is typically able to process a query that includes a content request if the request is formulated to substantially comply with and/or to be substantially compatible with a particular query language, such as the examples provided above.

However, it is worth observing that different servers may employ different approaches with respect to processing of client-server communications. One common approach is typically referred to as Representational State Transfer (REST) and may be used in connection with providing REST-type services via systems accessible via the World Wide Web (WWW). So-called REST-type application programming interfaces (APIs) may generate content requests by specifying uniform resource locators (URLs) and desired media types, often in the form of Hypertext Transfer Protocol (HTTP) communications. One aspect related to the approach mentioned above, REST, in the context of REST-type APIs, is that often different types of queries may be intended to be processed by different URLs, such as in situations in which different types of content is being requested, for example. That is, the URL itself, at least in part, may specify the content request being made, as a type of query, for example. As one illustrative example, URL 'https://api.github.com/users/123' may provide content about users.

As a result, in a REST-type approach, server performance and/or perceived server responsiveness, may be managed implicitly, in effect, via a manner in which content to be sought may be allocated across various URLs. More specifically, for example, content may be allocated in a manner so as to reduce a risk of a bottleneck (e.g., server overload) from query handling. In other words, content requests, made by query, may be categorized in terms of which particular server is intend to process a particular query that relates to a particular type of content request. However, a REST-type approach, as referred to above, may likewise make generating executable applications, such as mobile applications for consumer devices, more of a programming challenge. As one example, small changes to a URL, small changes to content to be obtained, etc., may result in a need for a custom software update, which may be undesirable in many circumstances.

In addition to the foregoing disadvantage, for some situations, due at least in part to aspects of a chosen query language, for example, allocation of content in the manner described above may not be feasible and/or desirable. As one possible example, this may potentially be the case for GraphQL. Instead, for example, with respect to Graph QL, content requests may handled by a common URL location, e.g., by an endpoint.

However, whereas having queries that include content requests handled by a single logical location may provide some desirable benefits, likewise, server management (e.g., performance management and/or management of perceived responsiveness) may be more challenging. That is, for example, server overload, which may affect performance and/or perceived responsiveness, may be more likely to occur. Likewise, race conditions, such as from multiple physical servers operating in parallel to handle queries for one logical endpoint, are more likely to occur, etc. Thus, an approach to at least potentially manage server performance, for example, more effectively, for such situations, may be desirable.

Furthermore, it likewise is additionally worth noting that such issues may, in some situations, be particularly challenging in connection with mobile applications. For example, a client device that also comprises a mobile device may employ a wireless connection, which may be less reliable and/or provide less bandwidth than a wired connection. Likewise, a mobile device may have a more limited amount of memory and/or processing capability relative to a desktop computing device, for example. It is specifically not intended for claimed subject matter to be limited to mobile applications. That is, claimed subject matter scope is also intended to include desktop applications and/or other applications executable by a computing device, whether or not such applications are intended to be specifically accessed by users; however, because mobile applications may present some challenges that may not be present for other types of applications, mobile applications are discussed below as an illustrative example.

FIG. 1 is a schematic diagram illustrating an embodiment 100. As shown, embodiment 100 includes endpoint 102, proxy 101, and control plane 103. For purposes of embodiment 100, proxy 101 and endpoint 102 need not be in close physically proximity, although shown to be in FIG. 1. Rather, in this illustration, proxy 101 and endpoint 102 may comprise separate network addressable devices able to exchange communications, such as via a computing and/or communications network. Although proxy 101 and endpoint 102 may comprise a variety of devices, for ease of discussion, in this example, these devices respectively comprise a computing device, such as a server, for example. Furthermore, it is noted that directionality, such as indicated by arrows in FIGS. 1, 2, 4, and 5, are representative examples and are not intended to be limitations or requirements with respect to claimed subject matter.

Thus, endpoint 102 may comprise an origin server. In the context of the present application, the term origin server refers to a server comprising an origin for content, which may, for example, be the object of client generated content requests (e.g., such as may be included in a query). Likewise, for ease of discussion, control plane 103 is illustrated separately from proxy 101; however, it may comprise a component of proxy 101, for example, in an embodiment. As depicted in FIG. 1, proxy 101 and control plane 103 are able to exchange communications, such as via a computing and/or communications network. Control plane 103 may comprise any of a variety of computing and/or networking devices.

Thus, as an example, origin server 102 may have a capability to process content requests, such as one or more queries formulated in GraphQL, as an example. In this example, one or more queries, that may include content requests intended for a single end point, e.g. a particular URL, may be processed via a single server. In another embodiment, however, there may be a single logical endpoint, but multiple content servers. Similarly, there may be a single logical proxy, but multiple proxy processes being executed, such as on one or more physically separate computing devices.

As suggested previously, managing a range of content requests may provide technical challenges, such as for an origin server, for example. As shall be described, for an embodiment, such as 100, a potential benefit of employing a control plane, such as control plane 103, to determine parameters for use by a proxy, such as parameters that may affect management of processing of one or more queries, may include a capability to dynamically adjust query-related rate-limiting parameters, for example, based, at least in part, on query-related resource consumption measurements, query-related performance measurements and/or query-related statistical measurements, as previously mentioned. Other potential benefits, described in more detail below, may also be present depending at least in part on a particular embodiment. Of course, these are illustrative examples, and claimed subject matter is not limited to examples provided for purposes of illustration.

Endpoint 102, in an illustrative embodiment, such as 100, may be identified by a Uniform Resource Locator (URL). Proxy 101 may process one or more queries (e.g., content requests formulated as query, as previously described) intended for endpoint 102, as will be described below. For example, an application, such as a mobile application, executing on a client device, such as a mobile device, may generate a request for content intended for endpoint 102. However, proxy 101 may operate as an intermediary with respect content requests, such as content requests intended for endpoint 102. Thus, it is noted that, a variety of architectures for exchange of network communications by an endpoint, proxy, and/or control plane are possible and intended to be covered by claimed subject matter. Thus, while queries intended for endpoint 102 may be processed by proxy 101, as suggested, a host of different mechanisms may be used, that are intended to be within claimed subject matter scope, so that proxy 101 is able to initially process queries that are ultimately intended to be processed by endpoint 102 at least with respect to content. Examples of some network communications approaches intended to be included are "push-type" network communications and/or "pull-type" network communications. Likewise, as yet another simple example, endpoint 102 and/or proxy 101 may both sit behind a router that may route signal packets.

In some situations, as alluded to previously, a variety of benefits may flow from employing a proxy, depending at least in part on a particular embodiment. For example, as previously described for a REST-type architecture, content requests may be implicitly managed at least partially via use of a variety of URLs which may be organized in a manner so that particular content is allocated to particular URLs. However, as suggested previously, in situations in which such an architecture may not be feasible and/or desirable, for example, use of a proxy, such as proxy 101, may facilitate management of query processing by an endpoint, such as endpoint 102, for example.

In an embodiment, this may be accomplished, for example, via determination of rate-limiting parameters, which may include dynamic determination, such as by control plane 103, for content requests to be handled by endpoint 102. The term 'dynamic' as used in the context of the present application, and also as used with respect to a description regarding the generation of parameters, refers to a capability to be changed (e.g., updated) as relevant conditions that could potentially affect such parameters change. Thus, for example, dynamic changes and/or updates made with respect to parameters may be periodic, aperiodic, continual, etc., depending at least in part on a particular implementation. Likewise, the term 'rate-limiting', 'rate-limit', 'parameter rate limit', 'parameter rate limiting', or the like, as used in the context of the present application, as alluded to previously, refers to specifying a limit (e.g., a limitation) on handling (e.g., processing) of particular queries (e.g., particular query type, queries that include particular content requests, queries that include particular types of content requests, etc.) with respect to an endpoint, such as limits that may specify handling of queries based at least in part on a variety of considerations, such as, for example, what types of queries to handle, how many queries to handle, and/or at what time to perform such query handling.

In this example embodiment, therefore, proxy 101 may be employed to implement use of rate-limiting parameters, determined dynamically, to filter queries, such as in embodiment 100. In an embodiment, rate-limiting parameters to be determined by control plane 103, for example, may be used by proxy 101. For example, control plane 103 may dynamically determine rate-limiting parameters, using, for example, query-related resource consumption measurements, based at least in part on parameter rate-limiting policies that may, for example, be externally specified.

Terms, such as 'rate-limiting policies,' 'parameter rate-limiting policies,' 'parameter rate-limit policies', 'rate-limit policies', or the like, in the context of the present application, refer to a set of rules, processes, etc., for determining handling of one or more queries, such as kinds of queries, amount of queries, rate of queries (e.g., particular query type, queries that include particular content requests, queries that include particular types of content requests, etc.), as well as other factors that potentially may affect endpoint performance and/or perceived responsiveness. As an illustrative, non-limiting example, query source in terms of IP address, user id, and/or geographical origin, etc., may be employed in some embodiments. Thus, for example, queries originating from some sources may be handled while queries origination from other sources may not. As another example, a specification of hierarchical organization of content types, nesting, and/or interrelationships between various content types at various levels of a hierarchical organization may likewise be employed. Thus, for example, depending at least in part on particulars of a given embodiment, content within a hierarchical specification that is 'deemed' to be more desirable may be processed ahead of content within the hierarchical specification 'deemed' less desirable. As a simple example, a content request that relates to a user may be processed ahead of a content request with respect to individuals related to a user, but that are not users themselves. Likewise, content 'deemed' less computationally intensive to locate within a content repository accessible by an endpoint may be processed ahead of content 'deemed' more computationally intensive to locate. Again, there are merely illustrative, non-limiting examples and are not intended to limit claimed subject matter scope.

Along similar lines, in an embodiment, rate-limiting policies may be based, at least in part, on measurements of resource consumption associated with processing of particular queries (e.g., particular query type, queries that include particular content requests, queries that include particular types of content requests, etc.). As mentioned previously, handling of queries may consume some portion of available resources, such as CPU load, memory usage, power consumption, etc., to provide only a few typical examples. Thus, as particular queries may be processed, (e.g., particular query type, queries that include particular content requests, queries that include particular types of content requests, etc.), measurements of available resources consumed, such as an amount thereof and/or kind of resource, etc., may be taken.

Likewise, in an embodiment, as resource consumption measurements are generated, they may be accumulated, such as, in an embodiment, by an endpoint, such as endpoint 102. Likewise, as previously suggested, in an embodiment, a control plane may employ generated measurements, such as generated by an endpoint, for example, to dynamically determine rate limiting parameters, based at least in part on, rate limiting policies, which may in some embodiments comprise substantially in accordance with rate limiting policies, for example.

It is likewise noted that typically query handling performance may vary at least in part based on use of available resources (e.g., resource consumption). Thus, measurements thereof may be employed, in an embodiment, such as by a control plane, to dynamically determine rate limiting parameters, for example. As one example illustration, latency (e.g., delay in handling a query) may comprise an aspect of query handling performance, which, of course, may be measured. Thus, continuing with the example, resource consumption associated with a particular latency to handle a particular query (e.g., particular query type, queries that include particular content requests, queries that include particular types of content requests, etc.), for example, may also be measured. In an embodiment, likewise, such measurements may be accumulated. Thus, as a deliberately simplified example (e.g., for ease of illustration), a period of time may be measured from initiation of handling a query to its completion and, likewise, associated consumption of available resources, such as memory usage, CPU usage, and/or network usage, etc., may also be measured. Thus, as mentioned, such measurements, having been accumulated, may be employed, in an embodiment, such as by a control plane, to dynamically determine rate limiting parameters, for example. Furthermore, continuing, in an embodiment, for example, after having accumulated measurements, such as those previously described, which were provided as simple examples, likewise, predictive estimates may also be determined regarding how various changes in conditions may potentially affect resource consumption and/or query handling performance, as well as generation of predictive estimates of potential relationships between the two, for example.

Likewise, in embodiments, as previously suggested, rate-limiting parameters, for example, may be updated dynamically, such as by control plane 103, in an embodiment. For example, as measurements, such as previously discussed, may be generated and accumulated, and further, as measurements may be processed, for example, dynamic changes may be made to parameters that, in an embodiment, may be used at least in part to affect query handling determinations.

As another deliberately overly simplified example, again, simply for ease of illustration, a query type (e.g., content request type) may have previously been determined to consume relatively low or at least acceptable levels of resources. Thus, it may be that control plane 103 may determine parameters that may be implemented by proxy 101, for example, so that the particular type of query, in this simplified illustrative example, may be processed by endpoint 102 without delay. However, in some situations, changes in network traffic conditions may result in measurements, e.g., generated at endpoint 102, indicating that under such changed conditions, more resources may be consumed to process the particular query type in this example and/or performance may potentially be impacted. For example, again, although simplified for ease of illustration, if a server is busy performing other tasks, such as due to an increase in network traffic, generated and accumulated measurements may now indicate, for example, that under such changed conditions, it may take a great amount time to complete such processing of the particular query type. Thus, in this simplified example, based at least in part on rate limiting policies, that may have previously been specified, a dynamic adjustment may be made to rate limiting parameters so that, for example, processing of this particular type of query may now be delayed until another change occurs in network traffic conditions, such as an acceptable reduction in network traffic. Thus, in an embodiment, for example, control plane 103 may dynamically determine updated rate-limiting parameters, such as at various times, and/or substantially according to a specified schedule, for example, which may, for example, be employed by proxy 101. Again, as examples, rate parameters may be updated periodically, aperiodically, continually, etc.

In other embodiments, proxy 101 may also accumulate and store a variety of query-related statistics, which may include, for example, statistics related to queries identified to be handled (e.g., processed) by endpoint 102. Again, this may include a variety of query related measurements. As simply a few illustrative examples, this may include statistics with respect to externally originating queries in which the statistics relate to a wide variety of aspects thereof, such as: statistics with respect to queries designated to be handled by an endpoint at a particular rate per unit time, statistics with respect queries designated to be handled if generated at particular times of day, statistics with respect to queries designated to be handled if originating from particular IP addresses and/or particular user ids, statistics with respect to queries designated to be filtered, etc. etc. Likewise, control plane 103, in an embodiment, may employ query related statistical measurements, such as may be generated, accumulated and stored by proxy 101, to make dynamic determinations regarding rate-limiting parameters. For example, statistical measurements that may be real-time or nearly real time may indicate that from a statistical vantage point, at the $95^{th}$ percentile, overall system latency exceeds 100 ms. Thus, control plane 103 may, in this simple example, determine rate-limiting parameters so that queries that include a computationally time-consuming field are filtered, but that queries without such a computationally time consuming field are not filtered, at least until the overall system latency declines appropriately, as indicated via such statistical measurements.

In operation, proxy 101 may employ rate-limiting parameters to manage handling (e.g., processing) of queries with respect to endpoint 102, in this example. Thus, a query including a content request, for example, that was generated by an originating client may be ultimately filtered by proxy 101 so as to be omitted from processing by endpoint 102, based at least in part on one or more rate limit parameters, for example. In differing terminology, in this example, to process such a query at endpoint 102 would result in a violation of a rate limit so that via a gatekeeping function performed by proxy 101, such processing does not occur. In another example, there may be one or more rate limits that may relate to an API, for example, irrespective of query source, associations among queries, traffic conditions, etc., which would otherwise be exceeded, but for filtering performed by proxy 101. Similarly, certain content fields and/or types that may be requested via query may have specific rate-limits, which would otherwise be violated if not filtered by proxy 101.

Thus, for example, for an embodiment, in some situations, such as previously described, processing of such queries may not take place. Likewise, also as a simplified illustration, a message which may inform a client may be generated, such as, "Too Many Requests," for example, and/or an HTTP status code, e.g., HTTP status code 429. In another situation, however, for various reasons, such as an indication of potentially malicious network activity, a message and/or status code to inform a client may not be generated. In yet another example, for one or more rate-limit parameters, a particular query (e.g., particular query type, queries that include particular content requests, queries that include particular types of content requests, etc.), may be handled via endpoint 102, but only after a delay, such as a delay specified and implemented by proxy 101, in an embodiment.

Thus, as described, in an embodiment, proxy 101 may employ parameters, such as rate limiting parameters determined by control plane 103, to filter queries before processing thereof by endpoint 102. Likewise, in many cases, endpoint 102 may process certain queries and/or query types, for example, without substantial delay. Furthermore, again, in an embodiment, as previously indicated, control plane 103 may, for example, periodically, aperiodically, continually, etc., perform dynamic updating of rate limiting parameters, which may then be employed by proxy 101. In other embodiments, proxy 101 may store (e.g., cache) a set of rate-limiting parameters, which may, for example, comprise a real-time set, a representative set, an averaged set, etc., thereof, to use, for example, under circumstances which may arise, such as, for example, due to an interruption in network communications, such as between endpoint 102, control plane 103 and proxy 101, for example.

Although claimed subject matter is not intended to be limited to illustrative embodiments, for at least some embodiments, several potential benefits may result. For example, employing query-related rate-limiting parameters, based at least in part, on query-related structural features, query-related resource consumption measurements, query-related performance measurements and/or query-related statistical measurements, for example, may, potentially at least, decrease latency, increase website responsiveness, and/or decrease risk of endpoint overload occurring with respect to processing of queries that include content requests (and/or potentially with respect to providing other related services). Moreover, perceived performance of a mobile application involved in generating queries that include such content requests may also be improved as a result of proxy management of query processing to be performed by an endpoint, such as management by proxy 101 of query processing to be performed by endpoint 102, in this example.

Figure 2:
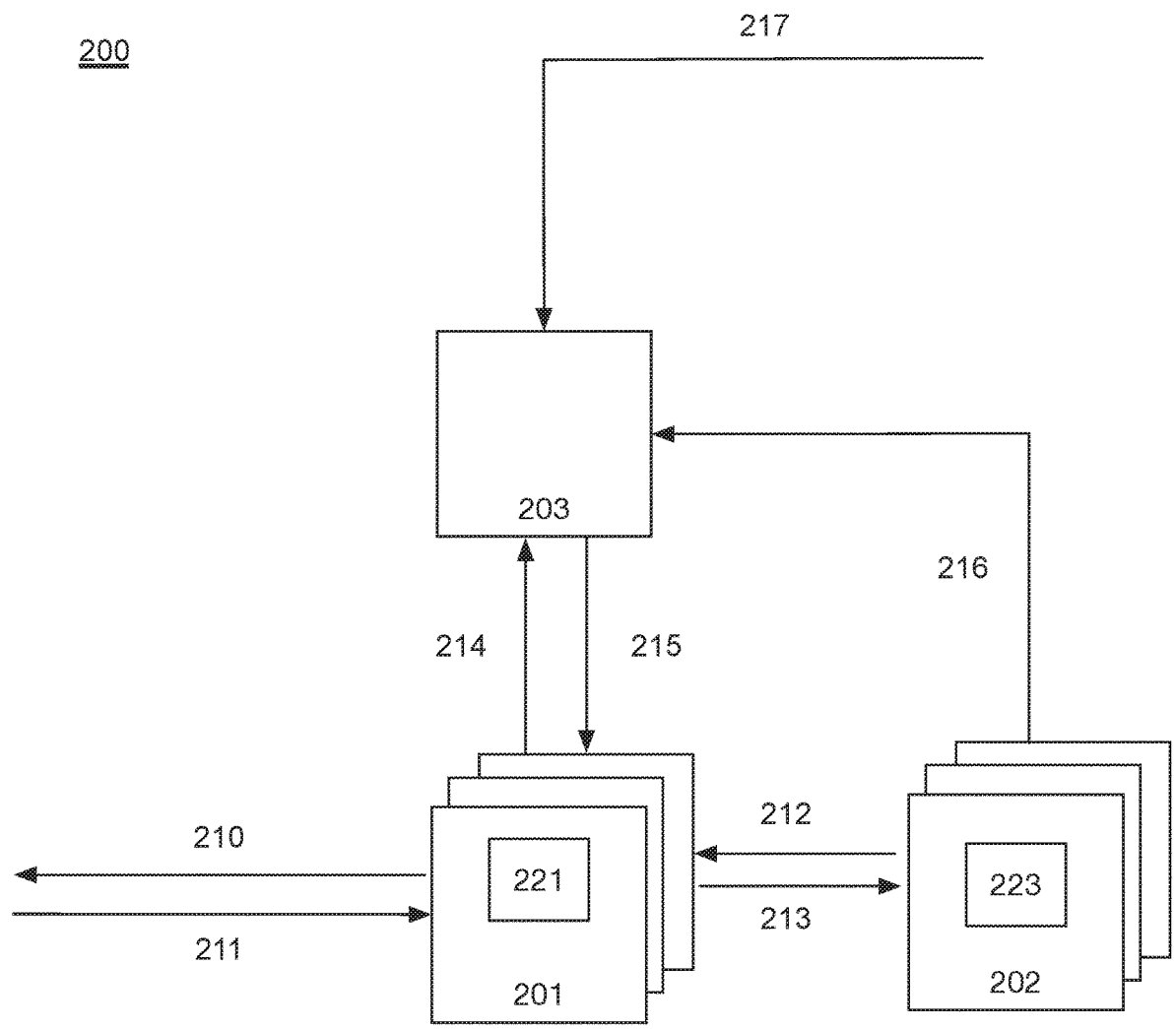
FIG. 2 is a schematic diagram illustrating another embodiment of an endpoint at a high-level.

FIG. 2 is a schematic diagram similar to FIG. 1, illustrating an embodiment 200. Again, as previously mentioned, it is noted that directionality, such as indicated by arrows in FIGS. 1, 2, 4, and 5, are representative examples and are not intended to be limitations or requirements with respect to claimed subject matter. FIG. 2 includes block 221, which depicts rate-limiting parameters to be employed, in an embodiment, by proxy 201, such as to filter queries in the manner previously described, for example. In an embodiment, rate-limiting parameters 221 may be stored on proxy 201, such as in one or more files, for example. Block 223 depicts content that may be employed, in an embodiment, by control plane 203, to determine rate-limiting parameters, which, again are to be employed by proxy 201 in an embodiment. For convenience, it is intended that proxy 201, endpoint 202, and control plane 203 operate in a similar manner as described in connection with proxy 101, endpoint 102, and control plane 103, respectively, shown in FIG. 1. Thus, as previously described with respect to FIG. 1, similarly, here, control plane 203 is illustrated separately from proxy 201; however, it may comprise a component of proxy 201, for example, in an embodiment.

As an illustrative example, rate-limiting parameters 221 may specify rate-limiting parameters for certain clients and/or sets of clients. In another illustrative example, rate-limiting parameters 221 may specify rate-limiting parameters in terms of fields, paths, and/or shapes, such as for a GraphQL type schema, for example. Thus, a GraphQL schema, for example, may comprise a specification of a set of content types and/or structures, levels of nesting, and/or fields, etc., which may indicate content available, such as to be queried. Similarly, a GraphQL path may specify for certain content fields, a path that may be followed and/or traversed to locate such content, such as in a repository. A GraphQL shape likewise may specify relationships within a GraphQL schema, such as for content types, etc., including interrelationships, nesting and/or other forms of association. In an embodiment, for example, rate-limiting parameters may be determined based at least in part on query-related resource consumption measurements and/or based at least in part, on query-related-performance measurements, such as may be associated with various GraphQL fields, schemas, paths, and/or shapes. In other examples, rate-limiting parameters may include "blacklists" and/or "whitelists." Blacklists may specifically identify prohibited clients. Thus, any queries or specified types of queries, etc., as examples, originating from such specified clients, in an embodiment, may ultimately not be handled (e.g., processed) by endpoint 202. Whitelists, on the other hand, may identify clients that are 'pre-authorized' for limited and/or unlimited access to content. Thus, depending at least in part on specifics, any queries or specified types of queries, etc., as examples, originating from such specified clients, in an embodiment, may be appropriately handled (e.g., processed) by endpoint 202. Along similar lines, 'whitelisting' and/or 'blacklisting' may employ other aspects other than an originating client, such as, for example, in connection with various GraphQL fields, schemas, paths, and/or shapes (e.g., particular aspects thereof).

FIG. 2 depicts additional approaches with respect to determination of rate limiting parameters by control plane 203. For example, directionality of arrow 217 illustrates that rate-limiting parameters 221 may be determined, at least in part, as a result of being specified, e.g., by a system administrator, and/or other source. However, as previously mentioned, directionality, such as indicated by arrows in FIGS. 1, 2, 4, and 5, are representative examples and are not intended to be limitations or requirements with respect to claimed subject matter. For example, a system administrator may create a configuration file to, at least in part, specify measurements, as previously described, and also as illustrated by 223, that may be employed by control plane 203 to determine, at least in part, rate-limiting parameters 221. In an embodiment, for example, a configuration file may specify an initial set of query-related performance measurements for use, for example, in determining rate limiting parameters. Furthermore, rate limiting parameters may then be updated, for example, using more recently acquired measurements. In another example, a set of fixed query-related resource consumption measurements may be employed, and specified not to be changed irrespective of changes that may be indicated by actual and/or more recent measurements.

A configuration file may, for example, contain executable code that may be executed by proxy 201, in an embodiment. Alternatively, a graphical user interface (GUI) may be implemented via executable code, to enable specification of rate-limiting parameters for proxy 201 via interaction with a GUI, such as via point and click selection of features, etc., in an embodiment. In another embodiment, code may be executed in a process separate from a proxy, such as proxy 201, and may, for example, push rate-limiting parameter updates to a control plane, such as control plane 203. Alternatively, a GUI to enable specification of rate limiting parameters may be executed via a proxy, a control plane, and/or via a computing device used for system administration, for example.

Figure 3:
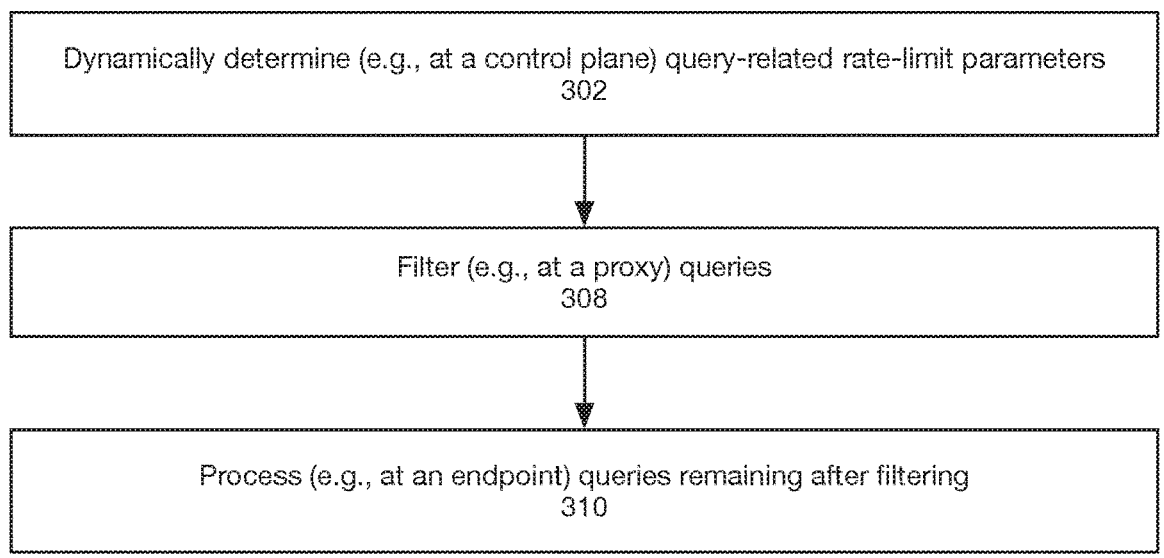
FIG. 3 is a flowchart illustrating an embodiment of a method of processing one or more queries, such as a query including a content-type request.

FIG. 3 is a flowchart for an embodiment 300 of a method of processing one or more queries, such as a query including a content request formulated in a particular query language, such as, e.g., GraphQL. One or more operations are illustrated in FIG. 3 with respect to an operational sequence that may be employed, in whole or in part. However, other sequences of the illustrated operations and/or other concurrent operations may likewise be employed, in whole or in part, and be within claimed subject matter. In addition, although the description below references particular aspects and/or features illustrated in certain figures, one or more operations may be performed with other aspects and/or features.

At block 302, a control plane, such as control plane 103 or control plane 203, depicted in FIGS. 1 and 2, respectively, may dynamically determine query-related rate-limit parameters, based at least in part on measurements of query-related resource consumption (and/or based at least in part on query-related structural features, query-related performance measurements and/or query-related statistical measurements), such as at an endpoint, such as at endpoint 102 or endpoint 202, depicted in FIGS. 1 and 2, respectively. At block 308, a proxy, such as 101 or 201, referenced previously, may filter one or more queries. For example, filtering may be based at least in part on dynamically determined query-related rate-limiting parameters, such as may be determined by a control plane, such as control plane 103 or 203, previously discussed. At block 310, queries remaining after filtering may be processed by an endpoint, such as endpoint 102 or endpoint 202, previously discussed.

Figure 4:
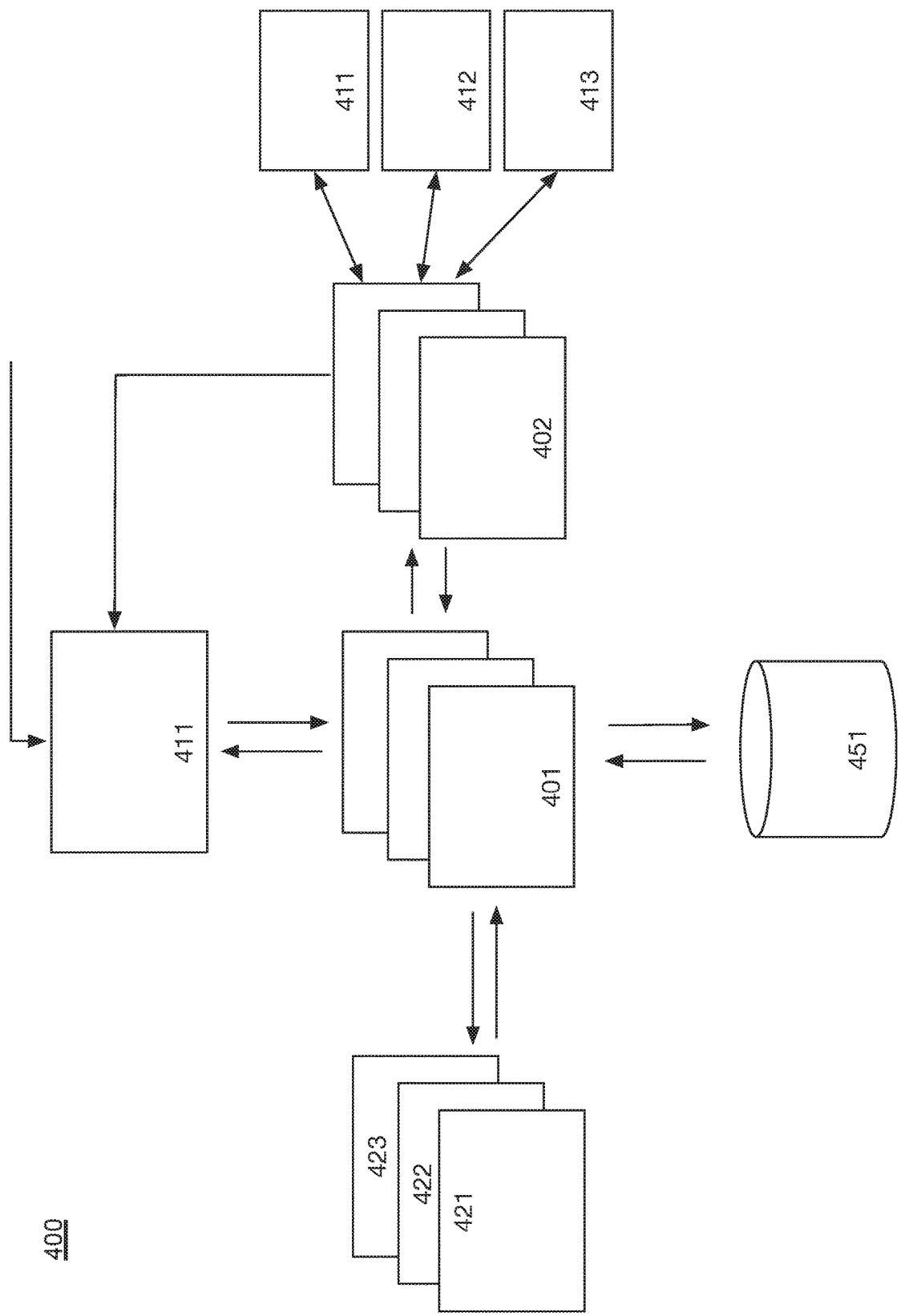
FIG. 4 is a schematic diagram illustrating yet another embodiment of an endpoint at a high-level.

FIG. 4 is a schematic diagram of yet another embodiment 400. As previously mentioned, it is noted that directionality, such as indicated by arrows in FIGS. 1, 2, 4, and 5, are representative examples and are not intended to be limitations or requirements with respect to claimed subject matter. FIG. 4 shows one or more endpoints 402 that may comprise one or more GraphQL compliant and/or GraphQL compatible endpoints. Likewise, FIG. 4 depicts one or more content sources 411-413, which may be stored on one or more endpoints 402, such as in one or more databases, for example. Alternatively, one or more content sources 411-413 may be stored on various other network devices communicatively coupled to one or more endpoints 402, for example, via a network. Likewise, FIG. 4 also shows that one or more proxies 401 may have access to other stored resources, such as, database 451, simply as an illustration. Thus, as depicted in FIG. 4, embodiment 400 comprises one or more proxies 401 and one or more endpoints 402. In this example, one or more endpoints 402 and/or one or more proxies 401, respectively, may operate with respect to queries generated by one or more clients 421-423 in a manner similar to proxy 101 and/or proxy 201, and/or similar to endpoint 102 and/or endpoint 202, respectively. Thus, as previously described with respect to FIGS. 1 and 2, similarly, here, control plane 411 is illustrated separately from one or more proxies 401; however, it may comprise a component thereof, for example, in an embodiment. Thus, as simply an example, one or more proxies 401 may implement a control plane via employing a consensus protocol and via exchanging mutual communications with one another and with external resources, such as database 451, in this example. Thus, it is intended that claimed subject matter include such an embodiment, e.g., such as situations in which a proxy and control plane are not necessarily implemented via physically separate hardware devices, although, nonetheless, employed as logically separate entities.

Embodiment 400 further depicts control plane 411, which may employ query-related resource consumption measurements, such as generated by one or more endpoints 402, query-related statistical measurements, such as generated by one or more proxies 401, query-related statistical features, query-related performance measurements, and/or configuration content generated at locations capable of being access via a network, for example. Thus, in an embodiment, control plane 411 may determine query-relevant rate-limiting parameters, for example, based, at least in part, on query-related structural features, query-related performance measurements, query-related statistical measurements and/or query-relevant resource consumption measurements, in an embodiment. Generally, for example, control plane 411 is able to operate in a similar manner as control planes 103 and/or 203, described above in connection FIGS. 1 and 2, respectively.

As described above, embodiments include various network structures to be employed for content requests to be processed. For example, one or more endpoints 402 may comprise one or more servers, as previously described, able to process content requests in the form of GraphQL queries to be generated by client applications. For example, endpoints 402, in an embodiment, may process selected queries with respect to requested content available at one or more content sources 411-413. It is noted that requested content may be made available in any one of a number of possible formats, such as in a JSON format, in this illustrative example. The term JavaScript Object Notation, JSON, and/or similar terms are intended to refer to any version, now known and/or to be later developed, of the JSON file-format.

Accordingly, in an embodiment, control plane 411 may coordinate across multiple proxies 401 and/or multiple endpoints 402. For example, query-related statistical measurements generated by one or more proxies may be used, potentially beneficially, by a control plane to dynamically determine query-related rate-limiting parameters. By employing query-related statistical measurements generated by multiple servers e.g., beyond what may be generated by one proxy, rate-limits may be determined using a wider set of query samples. Moreover, rate-limiting parameters, based at least in part on query-related statistical measurements generated by multiple servers, for example, may permit dynamic determination of rate limiting parameters to be employed by a control plane so as to enable, in some embodiments, increased responsiveness to potential variations in network infrastructure and/or traffic conditions.

In addition, in some embodiments, query-related resource consumption measurements and/or query-related performance measurements, such as from one or more endpoints, may enable dynamic determination of rate-limiting parameters using a wider set of resource consumption measurements. Likewise, determination of rate-limiting parameters dynamically by a control plane able to coordinate across multiple proxies 401 and/or multiple endpoints 402 may enable potentially improved load balancing across one or more proxies and/or one or more endpoints.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal and/or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components and/or memory states, as examples, necessarily implies that memory, such memory components and/or memory states, continuing with the example, is tangible (e.g., non-transitory).

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like.

Furthermore, the terms "first," "second" "third," and the like are used to distinguish different aspects, such as different components, as one example, rather than supplying a numerical limit and/or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements and/or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all and/or a portion of the Internet. Thus, for example, a private network "in the cloud" may refer to a private network that comprises a subset of the Internet. Although signal packet and/or frame communications (e.g., signal communications) may employ intermediate devices of intermediate nodes to exchange signal packets and/or signal frames, those intermediate devices may not necessarily be included in the private network by not being a source and/or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters may include measurements, collections of measurements and/or values that may derived based at last in part on measurements and/or collections, thereof. As another example, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space.

Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer and/or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet and/or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" and/or "pulled," comprising one or more proxies, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven-layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, proxies, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present disclosure, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations.

Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

In the context of the present disclosure, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments.

Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, and/or any combination thereof. As mentioned, signal packets and/or frames, for example, may be exchanged, such as between a server device and/or a client device, as well as other types of devices, including between wired and/or wireless devices coupled via a wired and/or wireless network, for example, and/or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" and/or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices and/or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, and/or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

Figure 5:
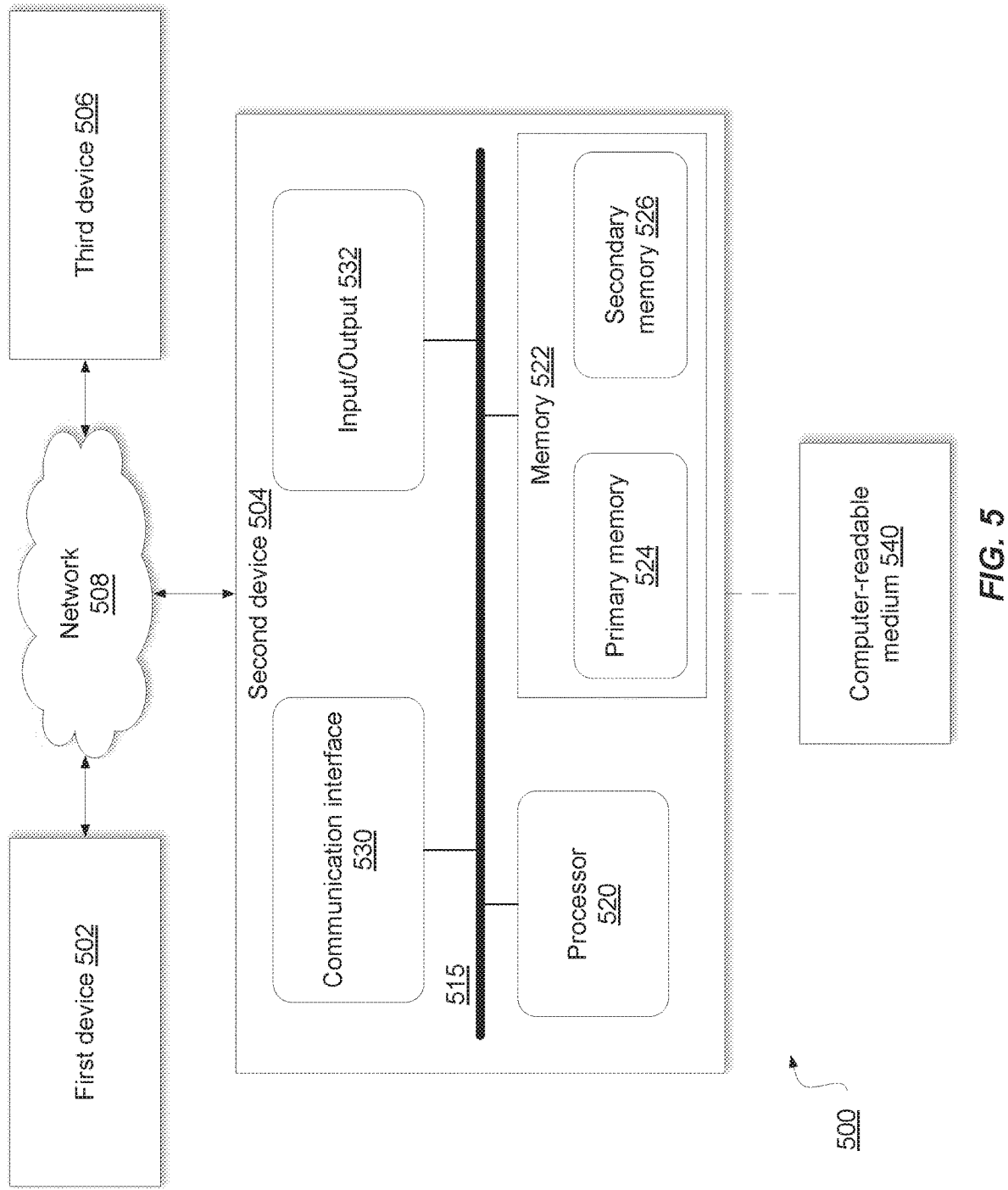
FIG. 5 is an illustration of an embodiment of a system in a networking and/or computing environment.

In one example embodiment, as shown in FIG. 5, a system embodiment may comprise a local network (e.g., device 504 and medium 540) and/or another type of network, such as a computing and/or communications network. For purposes of illustration, therefore, FIG. 5 shows an embodiment 500 of a system that may be employed to implement either type or both types of networks. Network 508 may comprise one or more network connections, links, processes, services, applications, and/or resources to facilitate and/or support communications, such as an exchange of communication signals, for example, between a computing device, such as 502, and another computing device, such as 506, which may, for example, comprise one or more client computing devices and/or one or more server computing device. By way of example, but not limitation, network 508 may comprise wireless and/or wired communication links, telephone and/or telecommunications systems, Wi-Fi networks, Wi-MAX networks, the Internet, a local area network (LAN), a wide area network (WAN), and/or any combinations thereof.

Example devices in FIG. 5 may comprise features, for example, of a client computing device and/or a server computing device, in an embodiment. It is further noted that the term computing device, in general, whether employed as a client and/or as a server, and/or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in the text accompanying FIGS. 1, 2 and 4.

Referring now to FIG. 5, in an embodiment, first and third devices 502 and 506 may be capable of rendering a graphical user interface (GUI) for a network device and/or a computing device, for example, so that a user-operator may engage in system use. Device 504 may potentially serve a similar function in this illustration. Likewise, in FIG. 5, computing device 502 ('first device' in figure) may interface with computing device 504 ('second device' in figure), which may, for example, also comprise features of a client computing device and/or a server computing device, in an embodiment. Processor (e.g., processing device) 520 and memory 522, which may comprise primary memory 524 and secondary memory 526, may communicate by way of a communication bus 515, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, and/or any combination thereof (other than software per se). Computing device 504, as depicted in FIG. 5, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, and/or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic and/or international telephone number, an Internet Protocol (IP) address, and/or one or more other identifiers. In other embodiments, a computing and/or communications network may be embodied as a wired network, wireless network, and/or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 5, computing device 502 may provide one or more sources of executable computer instructions in the form physical states and/or signals (e.g., stored in memory states), for example. Computing device 502 may communicate with computing device 504 by way of a network connection, such as via network 508, for example. As previously mentioned, a connection, while physical, may not necessarily be tangible. Although computing device 504 of FIG. 5 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 522 may comprise any non-transitory storage mechanism. Memory 522 may comprise, for example, primary memory 524 and secondary memory 526, additional memory circuits, mechanisms, and/or combinations thereof. Memory 522 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 522 may be utilized to store a program of executable computer instructions. For example, processor 520 may fetch executable instructions from memory and proceed to execute the fetched instructions. Memory 522 may also comprise a memory controller for accessing device readable-medium 540 that may carry and/or make accessible digital content, which may include code, and/or instructions, for example, executable by processor 520 and/or some other device, such as a controller, as one example, capable of executing computer instructions, for example. Under direction of processor 520, a non-transitory memory, such as memory cells storing physical states (e.g., memory states), comprising, for example, a program of executable computer instructions, may be executed by processor 520 and able to generate signals to be communicated via a network, for example, as previously described. Generated signals may also be stored in memory, also previously suggested.

Memory 522 may store electronic files and/or electronic documents, such as relating to one or more users, and may also comprise a device-readable medium that may carry and/or make accessible content, including code and/or instructions, for example, executable by processor 520 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general-purpose computing and/or network device, such as a general-purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state and/or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 5, processor 520 may comprise one or more circuits, such as digital circuits, to perform at least a portion of a computing procedure and/or process. By way of example, but not limitation, processor 520 may comprise one or more processors, such as controllers, microprocessors, microcontrollers, application specific integrated circuits, digital signal processors, programmable logic devices, field programmable gate arrays, the like, and/or any combination thereof. In various implementations and/or embodiments, processor 520 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 5 also illustrates device 504 as including a component 532 operable with input/output devices, for example, so that signals and/or states may be appropriately communicated between devices, such as device 504 and an input device and/or device 504 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method of managing an endpoint, the endpoint capable of handling one or more queries formulated in a particular query language, the method comprising:

dynamically determining, at a control plane, one or more query-related rate-limiting parameters based at least in part on one or more query-related structural features and based at least in part on one or more parameters obtained from the endpoint, wherein the endpoint comprises an origin server specified by the one or more queries as a particular location at which content requested by the one or more queries is stored, and wherein the one or more parameters obtained from the endpoint comprises at least one parameter indicative of a change in resource consumption for one or more particular query types;

filtering, at a proxy, at least one of the one or more queries designated to be handled by the endpoint based at least in part on the one or more control plane-determined query-related rate-limiting parameters, wherein the control plane, the proxy and the endpoint comprise separate network addressable devices; and permitting the endpoint to handle any remaining queries of the one or more queries after filtering at the proxy.

2. The method of claim 1, wherein the filtering at the proxy the at least one of the one or more queries designated to be handled by the endpoint comprises filtering at the proxy the at least one of the one or more queries designated to be handled by the endpoint substantially in accordance with the one or more control plane-determined query-related rate-limiting parameters and in accordance with one or more externally specified rate-limiting policies.

3. The method of claim 1, wherein the dynamically determining, at the control plane, the one or more query-related rate-limiting parameters further includes dynamically determining, at the control plane, the one or more query-related rate-limiting parameters based at least in part on one or more measurements of network usage at the endpoint.

4. The method of claim 1, wherein the dynamically determining at the control plane comprises dynamically determining the one or more query-related rate-limiting parameters based at least in part on one or more measurements of network traffic conditions at the endpoint.

5. The method of claim 1, wherein the any remaining queries of the one or more queries comprises at least one remaining query, and further comprising, after the filtering, delaying at the proxy the at least one remaining query to be handled at the endpoint so that processing thereof at the endpoint is delayed.

6. The method of claim 1, wherein the dynamically determining, at a control plane, the one or more query-related rate-limiting parameters based at least in part on the one or more query-related structural features further includes dynamically determining, at the control plane, the one or more query-related rate-limiting parameters based, at least in part, on one or more measurements of query-related performance.

7. The method of claim 6, wherein the dynamically determining, at the control plane, the one or more query-related rate-limiting parameters based at least in part on the one or more measurements of query-related performance comprises dynamically determining, at the control plane, the one or more query-related rate-limiting parameters based at least in part on one or more measurements of query-related latency.

8. The method of claim 1, wherein the dynamically determining, at the control plane, the one or more query-related rate-limiting parameters further includes dynamically determining, at the control plane, the one or more query-related rate-limiting parameters based at least in part on one or more query-related statistical measurements generated at the proxy.

9. The method of claim 8, wherein the dynamically determining, at the control plane, the one or more query-related rate-limiting parameters based at least in part on the one or more query-related statistical measurements generated at the proxy further comprises dynamically determining, at the control plane, the one or more query-related rate-limiting parameters based at least in part on the one or more query-related statistical measurements generated at the proxy substantially in real-time.

10. The method of claim 1, wherein the particular query language comprises GraphQL.

11. The method of claim 1, wherein the filtering at the proxy the at least one of the one or more queries designated to be handled by the endpoint comprises filtering at more than one proxy one or more queries to be handled by the endpoint.

12. The method of claim 1, wherein the endpoint comprises more than one origin server.

13. An apparatus comprising:
a proxy comprising at least one processor and at least one memory, wherein the proxy to employ one or more rate-limiting parameters to filter at least one of one or more queries in order to manage query handling by an endpoint, wherein the endpoint comprises an origin server specified by the one or more queries as a particular location at which content requested by the one or more queries is stored, wherein the one or more rate-limiting parameters are to be dynamically determined at a control plane and wherein the one or more queries are to be formulated in a particular query language, wherein the control plane, the proxy and the endpoint comprise separate network addressable devices; and the control plane to dynamically determine the one or more rate-limiting parameters based, at least in part, on one or more query-related structural features and based at least in part on one or more parameters to be obtained from the endpoint, wherein the one or more parameters to be obtained from the endpoint to comprise at least one parameter indicative of a change in resource consumption for one or more particular query types.

14. The apparatus of claim 13, wherein the proxy comprises a proxy to filter the at least one of the one or more queries based at least in part on the one or more rate-limiting parameters and based at least in part in accordance with one or more externally specified rate-limiting policies.

15. The apparatus of claim 13, wherein the proxy comprises a proxy to filter the at least one of the one or more queries substantially in accordance with the one or more rate-limiting parameters based at least in part on one or more measurements of query-related latency.

16. The apparatus of claim 13, wherein the control plane to further dynamically determine the one or more rate-limiting parameters based, at least in part on one or more measurements of processor and/or memory usage to be generated at the endpoint.

17. The apparatus of claim 13, wherein the control plane to further determine the one or more rate-limiting parameters based, at least in part, on one or more query-related statistical measurements generated at the proxy.

18. The apparatus of claim 13, wherein the control plane to further determine the one or more rate-limiting parameters based, at least in part, on one or more measurements of query-related performance.

19. The apparatus of claim 13, the particular query language to comprise GraphQL.

20. The apparatus of claim 13, wherein the proxy to comprise more than one proxy.

21. The apparatus of claim 13, wherein the endpoint comprises more than one origin server.

22. An article comprising:
a non-transitory storage medium having stored thereon instructions executable by at least one computing device, the at least one computing device comprising at least one processor and at least one memory, wherein the at least one computing device to:
execute instructions on the at least one processor, the instructions to be executed to have been fetched from the at least one memory; and store in the at least one memory any results to be generated from execution of the instructions on the at least one processor;

wherein the instructions to be executed comprise instructions to operate a proxy, the proxy to assist in managing query handling by an endpoint;

wherein the proxy instructions to be executed further to:

employ rate-limiting parameters to filter at least one of one or more queries in order to manage the query handling by the endpoint, wherein the one or more queries are to be formulated in a particular query language, wherein the rate-limiting parameters to be dynamically determined at a control plane based at least in part on one or more query-related structural features and based at least in part on one or more parameters to be obtained from the endpoint, wherein the endpoint to comprise an origin server specified by the one or more queries as a particular location at which content requested by the one or more queries is stored, wherein the one or more parameters to be obtained from the endpoint to comprise at least one parameter indicative of a change in resource consumption for one or more particular query types, and wherein the proxy, the control plane and the endpoint to comprise separate network addressable devices.

23. The article of claim 22, wherein the proxy comprises a proxy to filter the at least one of the one or more queries based at least in part on the dynamically determined rate-limiting parameters and on one or more measurements of network usage to be generated at the endpoint.

24. The article of claim 22, wherein the proxy comprises a proxy to filter the at least one of the one or more queries substantially in accordance with the dynamically determined rate-limiting parameters based at least in part on one or more measurements of query-related performance.

25. The article of claim 22, the particular query language to comprise GraphQL.

26. The article of claim 22, wherein the proxy to comprise more than one proxy.

* * * * *